United States Patent
Böhm et al.

(10) Patent No.: US 8,121,382 B2
(45) Date of Patent: Feb. 21, 2012

(54) METHOD FOR SETTING AT LEAST ONE CONTROL VARIABLE OF A FILTER FOR NOISE REDUCTION IN MEDICAL IMAGES

(75) Inventors: Stefan Böhm, Oberasbach (DE); Sandra Martin, Herzogenaurauch (DE); Ralph Wössner, Alpirsbach (DE)

(73) Assignee: Siemens Aktiengesellschaft, Munich (DE)

( * ) Notice: Subject to any disclaimer, the term of this patent is extended or adjusted under 35 U.S.C. 154(b) by 438 days.

(21) Appl. No.: 12/437,762

(22) Filed: May 8, 2009

(65) Prior Publication Data

US 2009/0285461 A1    Nov. 19, 2009

(30) Foreign Application Priority Data

May 16, 2008  (DE) .................. 10 2008 023 915

(51) Int. Cl.
   *G06K 9/40*    (2006.01)
(52) U.S. Cl. .............. 382/132; 382/172; 382/260
(58) Field of Classification Search ............. 382/132, 382/172, 260
   See application file for complete search history.

(56) References Cited

U.S. PATENT DOCUMENTS

| | | | | |
|---|---|---|---|---|
| 6,353,674 B1 * | 3/2002 | Dewaele | ............... | 382/132 |
| 6,804,383 B2 * | 10/2004 | Ogino | ............... | 382/128 |

FOREIGN PATENT DOCUMENTS

| | | |
|---|---|---|
| DE | 103 09 166 A1 | 9/2004 |
| DE | 102005034374 B3 | 3/2007 |
| JP | 07087398 A | 3/1995 |

OTHER PUBLICATIONS

Marc Hensel, Bernd Lundt, Thomas Pralow Rolf-Rainer Grigat; "Robust and Fast Estimation of Signal-Dependent Noise in Medical X-Ray Image Sequences"; 2006; pp. 46-50; Hamburg, Germany.
S.I. Olsen; "Estimation of Noise in Images: An Evaluation"; Feb. 1993; pp. 319-323; vol. 55, No. 4; Copenhagen, Denmark.
Sandra Martin, Stefan Böhm; Bewegungsdetektion und zeitliche Filterung auf Bandpassbildern unter Verwendung mehrerer vorangegangener Bilder, ["Movement detection and temporal filtering of bandpass images using several earlier images"], [IPCOM] PrioArtDatabase http://www.ip.com/, Document No. IPCOM000166286D (https://priorart.ip.com/viewPub.jsp), (c) Siemens AG 2007, pp. 1-4.
Wernstedt, "Experimentelle Prozeβanalyse", 1989, pp. 44-53, 62-67, Veb Verlag Technik Berlin, ISBN 3-341-00676-1.
Ekstrom, "Digital Image Processing Techniques", 1984, pp. 33-41, Academic Press, Inc., ISBN 0-12-236760-X.

* cited by examiner

*Primary Examiner* — Wensing Kuo

(57) ABSTRACT

A method for setting a control variable of a filter for noise reduction in medical images is provided. Image data of the medical images is classified into at least one noise region and at least one structure region. A variance measurement is performed either for all the image pixels or a subset of them to determine the edge thicknesses. A histogram is generated from the edge thicknesses. The maximum of the histogram is determined and a Gaussian curve is fitted to the histogram. A threshold value for noise and structure is determined as a function of the standard deviation of the Gaussian curve. The noise and structure are measured in the regions. The standard noise and structure deviations are determined and compared. The control variable is setup as a function of the comparison of noise and structure. The invention can be used for reduction of temporal noise in bandpass images.

9 Claims, 4 Drawing Sheets

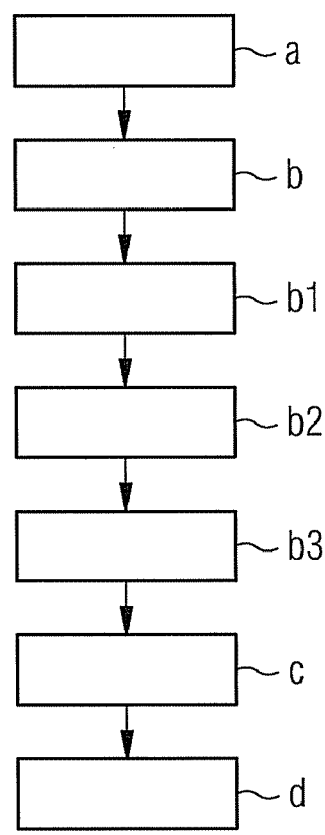
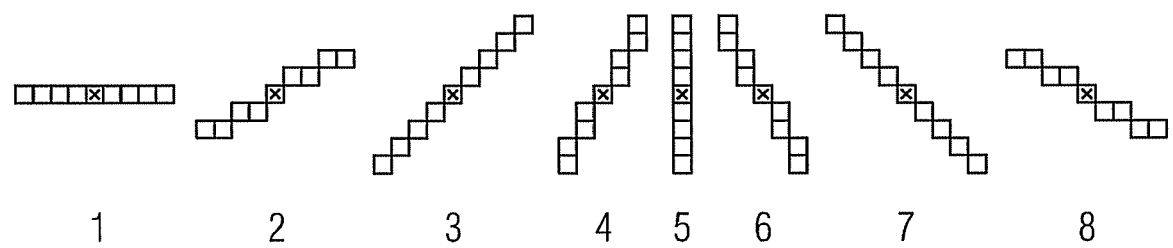

METHOD FOR SETTING AT LEAST ONE CONTROL VARIABLE OF A FILTER FOR NOISE REDUCTION IN MEDICAL IMAGES

CROSS REFERENCE TO RELATED APPLICATIONS

This application claims priority of German application No. 10 2008 023 915.1 filed May 16, 2008, which is incorporated by reference herein in its entirety.

FIELD OF THE INVENTION

The invention relates to a method and a device for setting at least one control variable of a filter for noise reduction in medical images, in particular for use in an X-ray diagnostic facility.

BACKGROUND OF THE INVENTION

For the purpose of generating fluoroscopic X-ray images during guidewire and catheter navigation, or during the insertion of a stent, and during vessel imaging, it is usual to use the lowest possible dose. Due to this low dose, the signal-to-noise ratio is very low, so that the image quality is very severely limited. Noise reduction filters are frequently used to improve the image quality. If these filter are given unsuitable parameter values, this can have the effect of blurring the structures contained in the image, which can result in a loss of information in the X-ray image. Another possible unfavorable effect is the generation of artifacts, i.e. of new structures in the image, which represents the insertion of erroneous information. In order to avoid these effects and the associated loss of information, the noise reduction filters must be suitably parameterized. With many noise reduction filters, multiscalar image decomposition is used to enable structures with different frequencies to be processed differently.

If the individual bandpasses are differently parameterized, the result is that adjustments require a major effort. In addition, it ought to be possible to adapt the parameter appropriately for data inputs which change due to the voltage (kV), fatness of the patient etc., to achieve a high effectiveness of the noise reduction filter and thus ensure a constant image quality.

It is possible to select the parameters for a filtering function as follows.

1. A first possibility is to adjust the parameters manually. In doing so, relevant regions are selected and measured for the noises and structure of the individual bands in an image. The parameters are then selected and fixedly set by reference to these measured values 2. An alternative to this is to perform automated measurements on images, and from these to draw conclusions about suitable parameters. For measurement purposes, the following are conceivable approaches:

A measurement is performed on the entire image on the basis of an estimated structure [Hensel06]. Here, the structure is estimated using a smoothing filter, and the noise is calculated as the difference between the original image and the structure image: noise image=original image−structure image.

This method is not suitable for bandpass data, because only high-frequency noise can be measured and thus no conclusions are possible about the low frequency portion of the noise.

A second possibility is a partial measurement, in which only relevant regions of the image are considered. One possibility for realizing such a method is to subdivide the image into blocks. Such methods are known from [Olsen93]. Here, the input data is split up into blocks of the same size, and for each of them the standard deviation is calculated. It is assumed that the blocks with the lowest standard deviation contain no structure, but only noise. They are therefore used for noise measurement. These methods are only suitable for signal-independent noise, because they have a tendency to select those blocks which have the lowest noise levels.

SUMMARY OF THE INVENTION

The object of the invention consists in improving the method for reducing noise in medical images of the type described in the introduction.

This object is achieved by the characteristics specified in the independent claims. Advantageous developments of the invention are specified in the dependent claims.

The subject matter of the invention is a method for setting at least one control variable of a filter for noise reduction in medical images, which has the following steps:

a) use of image data from at least one medical image, b) classification of the image data into at least one noise region and into at least one structure region, b1) whereby a variance measurement is performed in each case, either for all the image pixels or a subset of them, from which the edge thicknesses are determined in each case, b2) whereby a histogram is generated from the edge thicknesses determined in step b1) or from a subset of them, the maximum of the histogram is determined and a Gaussian curve is fitted to the histogram, b3) whereby, for the purpose of determining the noise and structure regions, a threshold value for noise and structure is determined as a function of the standard deviation of the Gaussian curve, c) measurement of the noise and structure in the each of the regions concerned, whereby the standard deviations $\sigma_{Noise}$ and $\sigma_{Structure}$ in each of the regions are determined and compared, d) setting of the at least one control variable as a function of the result of the comparison of noise and structure made in step c).

Another aspect of the invention is an imaging system for use in medical diagnostics which has facilities for performing the method described above and has the forms of embodiment described below, characterized by at least one facility for classifying image data into at least one noise region and at least one structure region, and at least one facility for setting at least one control variable, for a noise reduction filter used in the imaging system, as a function of a particular quality of the noise and structure region within the image data which is being used.

The inventive method is based on the measurement of noise and structure, in particular on bandpass data.

It is expedient, when there is a minimum level of difference between $\sigma_{Noise}$ and $\sigma_{Structure}$, to redetermine the structure region on the basis of a value which depends on the noise, and within this region to re-estimate the structure, by calculating the mean absolute value of the gray values of the image pixels lying in the region and the standard deviation of this absolute value, $\sigma_{AbsStructure}$, and to take this into consideration in the comparison mentioned in step c) above.

The edge thickness will preferably be calculated from the difference between a variance maximum and a variance minimum.

The further apart the two standard deviation values are, the more clearly can the difference between noise and structure be inferred.

It is advantageous to predefine or set a value for a particular type of dependence between how far apart the standard deviations are and the at least one control variable.

For robust and frequency-selective structure detection, use is made of a filter function in accordance with the invention which is distinguished by the following:
 robustness against noise with no prior filtering,
 the possibility of selecting relevant frequency ranges by the use of a partial reconstruction from bandpass data,
 stable detection results over wide dynamic ranges.

As mentioned above, different frequency ranges can be considered in making a classification into noise and structure. The choice of the regions of the image which contribute to the measurement can be adapted to the requirements concerned.

It is advantageous to use a threshold method, which provides reliable threshold values for an edge image and which functions stably on images with very different structure elements. The threshold values permit binary masks to be defined for areas which are lacking in structure or rich in structure.

The subsequent measurements in the image regions concerned supply measurement values for noise and structure. If the noise and structure can be clearly distinguished, structure measurement is further refined using the measurement values for the noise. This two-stage measurement makes it possible to distinguish structure even more clearly from noise.

Further forms of embodiment of the invention and their advantages are implied by the exemplary embodiments described below.

BRIEF DESCRIPTION OF THE DRAWINGS

An exemplary embodiment of the invention is described in more detail below, making reference to a drawing.

In this drawing are shown.

DETAILED DESCRIPTION OF THE INVENTION

Figure 1:
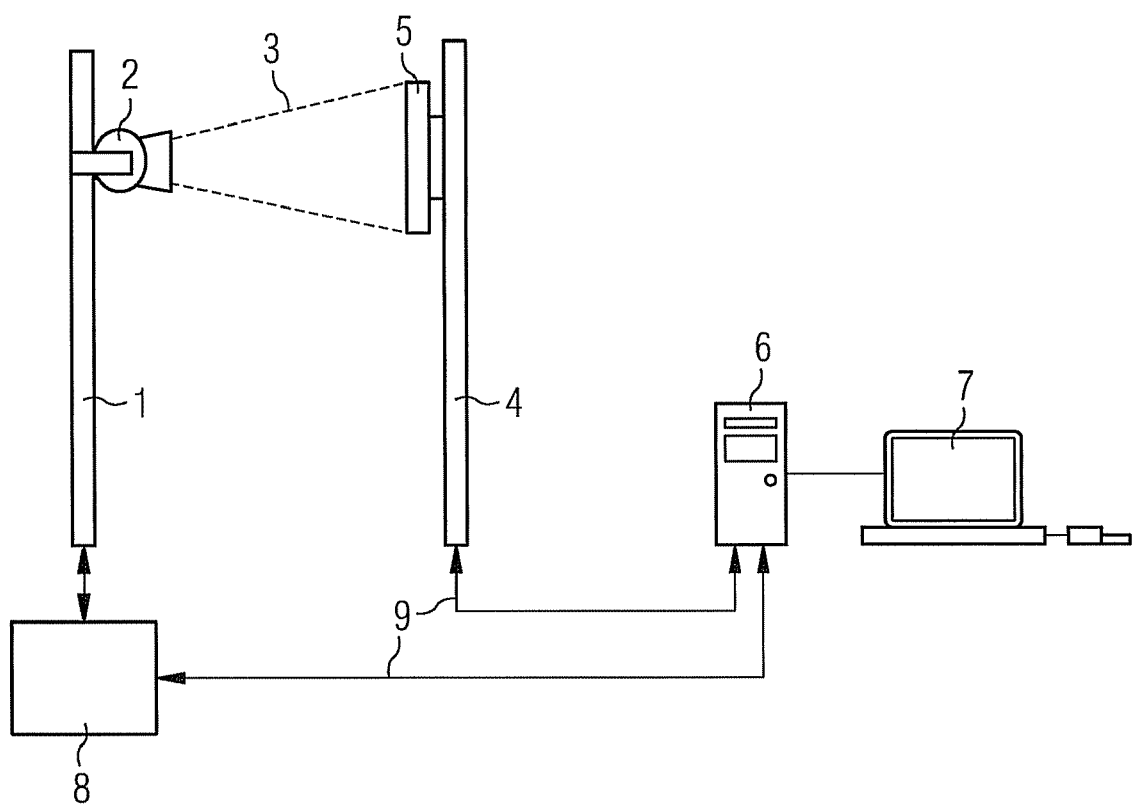
FIG. 1 a familiar X-ray diagnostic facility,
FIG. 2 a schematic flow diagram for the inventive method,
FIG. 3 a variance measurement for a directional mask,
FIG. 4a a histogram of the edge image,
FIG. 4b a smoothed histogram with approximating Gaussian curve,
FIG. 5 a mask image, with low-structure and structure-rich regions
FIG. 6 an example of the parameterization of the filter strength using measured values for the structure and noise.

FIG. 1 shows an example of an X-ray diagnostic facility with a first stand 1, attached to which in a way that allows its height to be adjusted is an X-ray source 2 which generates a cone-shaped X-ray beam 3, and a second stand 4, attached to which is an X-ray detector 5, at a height that is aligned towards the X-ray source 2 and so that the X-ray beam 3 falls on the X-ray detector 5. The output signal from the X-ray detector 5 is fed to an imaging computer or imaging system 6. This imaging system 6 can have a computer, a converter, an image store and processing circuits. For the purpose of presenting the X-ray images which have been captured it is linked to a presentation facility, e.g. a control monitor 7. A high-voltage generator 8 supplies the X-ray tubes in the X-ray source 2 with high voltage and heating voltage. The imaging system 6 is connected to the remaining components of the X-ray diagnostic facility by control and data lines 9.

The imaging system 6 of the X-ray diagnostic facility shown in FIG. 1 has facilities for performing the method in accordance with the invention, which is explained below in more detail for FIG. 2.

FIG. 3 shows an example of variance measurement and the determination of the minimum variance, as known for example from DE 103 09 166 A1. In the case of an example with nine image pixels in the filter mask, the procedure is in accordance with the following formula. The mean value $\overline{p}$ of the pixel values is subtracted from the pixel values $p_i$, the results are squared and their mean value is formed:

$$\mathrm{Var} = \sum_{i=0}^{8} (p_i - \overline{p})^2 / 9$$

Here, variance measurement is effected in a way dependent on the direction, i.e. within the filter masks.

The minimum of these variance values is determined, so as to derive the directions of edges.

FIG. 3 shows examples of the directional arrays 1 to 8 of the filter masks for eight different directions. However, there could also be other different directions, and more of them, together with a larger number of image points to be averaged.

FIG. 2 shows a schematic flow diagram for the inventive method, the method steps in which are labeled as a, b, b1, b2, b3, c and d. In what follows, the inventive method is explained in more detail:

The inventive method can be categorized as being in the class of partial measurement methods, mentioned in the introduction.

Measurement in Structure-Rich and Low-Structure Regions, in all Bands

The initial image (step a) is subdivided into regions which have little structure and regions which are distinguished by having a large proportion of structure. In each of these regions, measurements are made for noise and for structure. The classification (step b) of the image regions is made as follows:

Classification of Image Regions into Structure or Noise

For classification purposes, a variance measurement is undertaken as shown in FIG. 3. Here, for each pixel the most likely direction in which an edge runs is calculated. This is effected by calculating the variances of the pixel values along the directional masks (see FIG. 3). In doing so, it is assumed that the direction with the lowest variance corresponds to the direction of the edge.

Building on this, the square root of the difference between the largest and the smallest variance is used as a measure of the edge thickness. The classification into structure and noise will preferably be applied to images which have been normalized by reference to the low-pass. This makes it possible to compensate for the fact that in X-ray images the structural contrast depends on the signal.

Advantages of this method for calculating the edge thickness (step b1) are that its behavior is robust against noise even without any prior filtering, and it can be used both on bandpass data and also on images which have not been decomposed. Equally, the method can be applied to partial reconstructions of the bandpass images. It is also possible to use different partially reconstructed images for the recognition of noise and structure. This makes it possible to orientate the classification in the two cases to relevant frequency ranges.

Automatic Threshold Method

The next step (step b2) is to choose suitable threshold values for the generation of masks.

For this purpose, the histogram of the edge image is generated and smoothed. After this, the maximum is sought in the smoothed histogram, and then the Gaussian curve which best approximates the histogram.

Figure 4A:
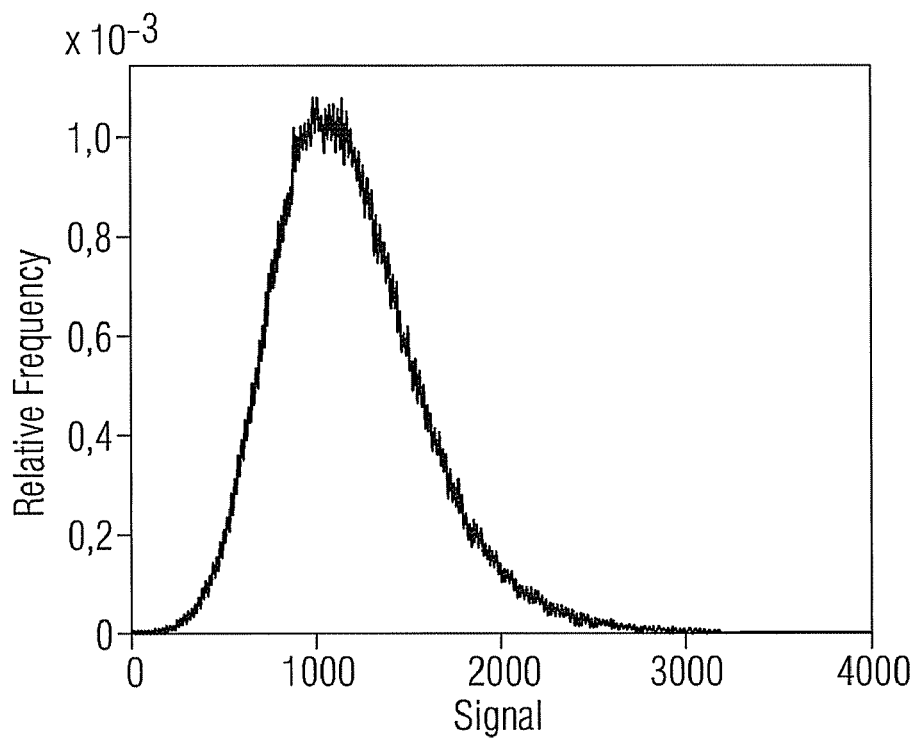

FIG. 4a shows an example of a histogram of the edge image. The scale on the X-axis of the co-ordinate system is the signal correlating to the edge thickness, and on the Y-axis it is the relative frequency.

Figure 4B:
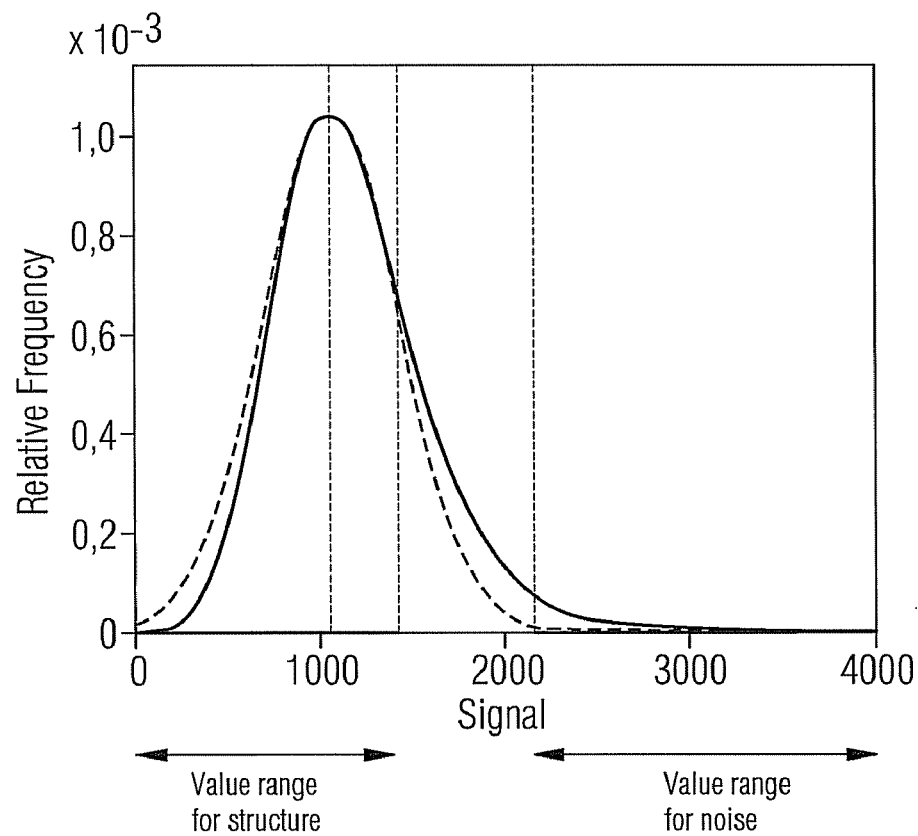

FIG. 4b shows an example of a smoothed histogram with an approximating Gaussian curve (dashed line). The value ranges derived from this for the noise and structure are identified by the lines with arrowheads at each end.

From the positions of the maximum $X_{Max}$, $Y_{Max}$ and the value of sigma for the Gaussian curve, $\sigma_{Gauss}$, it is possible to calculate suitable threshold values for the noise and structure masks (step b3):

$$T_{Noise} = X_{Max} + \sigma_{Gauss}$$

$$T_{Structure} = X_{Max} + 3 \cdot \sigma_{Gauss}$$

From these, it is possible to generate binary noise and structure masks.

Figure 5:
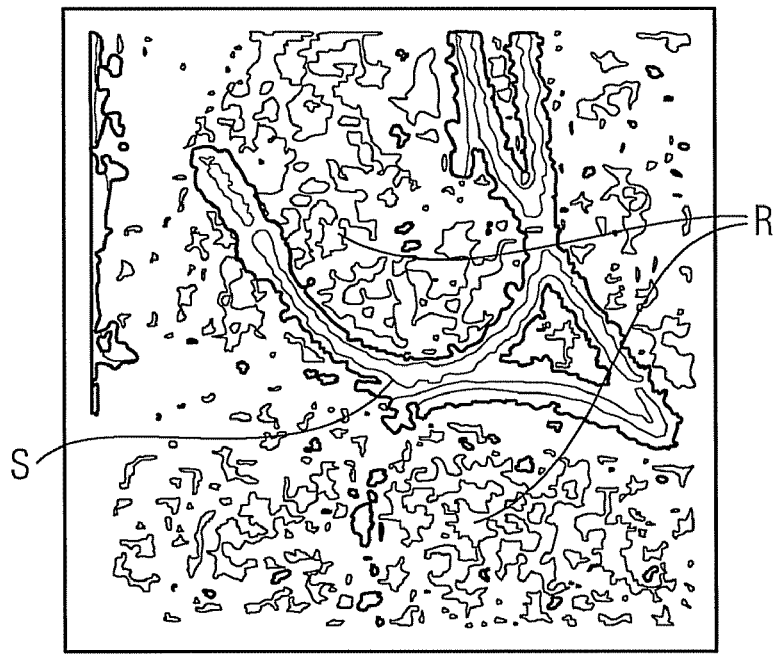

FIG. 5 shows an example of a mask image. The low-structure regions which are used for noise measurement are labeled R. The regions labeled S are used for measuring the structure.

The masks which are generated can be scaled and used for measurement within the bandpass images.

Measuring Noise and Structure

For the purpose of measuring noise and structure (step c), the standard deviations $\sigma_{Noise}$ and $\sigma_{Structure}$ within the two masks are now calculated for each band. These two standard deviations are then compared. If they differ significantly, i.e. as a minimum amount by a factor of more than 1.4, the assumption is made that noise and structure can be clearly distinguished in the bands. In this case, an N-sigma cut with N=2.0 will be applied, i.e. the only pixels considered will be those which deviate from the mean value by more than $2 \cdot \sigma_{Noise}$. For the gray values of these pixels, the mean absolute value $\mu_{AbsStructure}$ and the standard deviation of the absolute value $\sigma_{AbsStructure}$ is calculated, to obtain further conclusions about the structure. Each of the measurements is carried out for each bandpass image.

A possible example of the application of the inventive method described above is a temporal noise reduction for bandpass images with adaptive parameter setting, such as is known from the IP.Com Prior Art Database [IPCOM]. For this, the following steps are conceivable:

1) In the first step, an image is decomposed using a Laplace pyramid decomposition into 4 bandpasses and one low pass, the size of which in each case halves from level to level.

2) Following this, the method according to the invention is used for the measurement of noise and structure. The results are $\sigma_{Noise}$, $\sigma_{Structure}$, $\mu_{AbsStructure}$ and $\sigma_{AbsStructure}$ for all the bandpasses.

3) Estimating the probability of movement:
Calculation of the absolute gray value differences between the pixels in the bandpasses of the current image n and the pixels in the bandpasses of image n−1

$$d_{n,L} = |s^{(n)}(x,y) - s_{filtered}^{(n-1)}(x,y)|,$$

where the bandpass level L (L=1 means the bandpass with the highest frequencies, L=5 means low pass) and n specify the time point.

4) For each bandpass: calculation of the filter strength using the gray value difference from 3) and the measurement values from 2).

Figure 6:
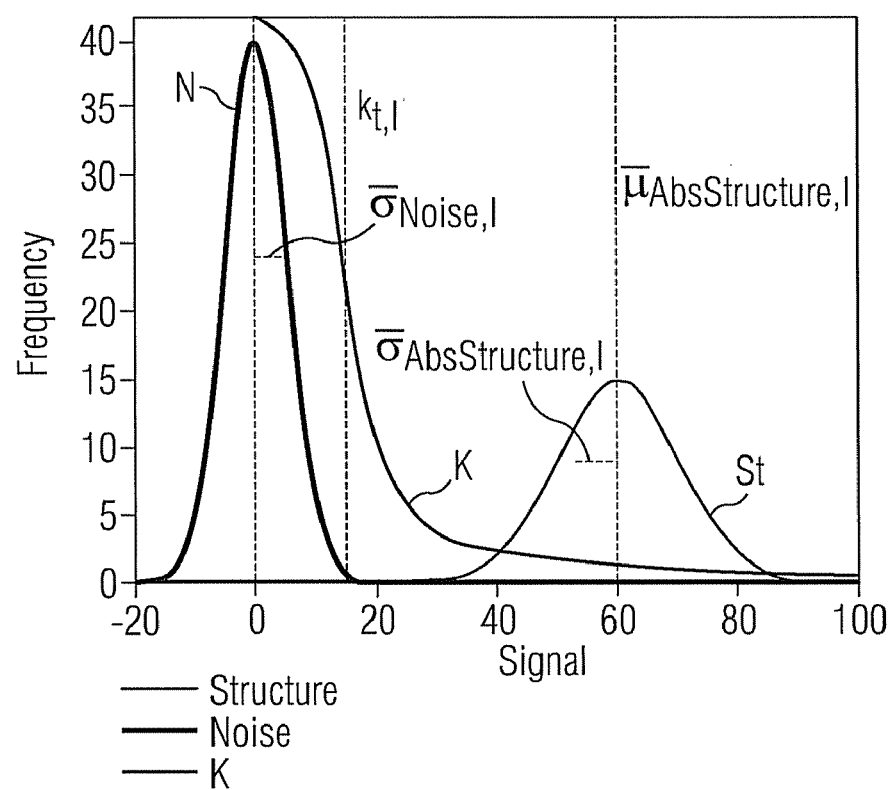

FIG. 6 shows the parameter settings for a filter strength k (the curve labeled K), effected using the measurement values for structure, $\mu_{AbsStructure}$, $\sigma_{AbsStructure}$ and for noise, $\sigma_{Noise}$. The curve labeled N shows the Gaussian curve for noise and the curve labeled St represents the Gaussian curve for structure.

Depending on such influencing factors as the voltage (kV), fatness of the patient, etc., and the desired image presentation, these transfer functions can deviate from those shown in the illustration.

5) Temporal filtering $$s_{filtered}^{(n)} = \frac{1}{k} \cdot s^{(n)} + \left(1 - \frac{1}{k}\right) \cdot s_{filtered}^{(n-1)}$$

6) Reconstruction of the Laplace pyramid

A temporal filtering function is described under 1) to 6), the filter strength of which adapts itself to the quality of the input image and its image content, in order thereby to achieve the best possible effect (strong noise filtering while retaining the structure).

REFERENCES

1. [Hensel06] Marc Hensel, Bernd Lundt, Thomas Pralow, and Rolf-Rainer Grigat. Robust and fast estimation of signal-dependent noise in medical x-ray image sequences. In Heinz Handels, Jan Ehrhardt, Alexander Horsch, Hans-Peter Meinzer und Thomas Tolxdoff (Publisher), Bildverarbeitung für die Medizin 2006: Algorithmen, Systeme, Anwendungen [Medical image processing 2006: Algorithms, systems, applications]; pages 46-50. Springer, 2006.
2. [Olsen93] S. I. Olsen. Estimation of noise in images: An evaluation. CVGIP: Graphical Models and Image Processing, 55:319-323, 1993.
3. DE 103 09 166 A1 (corresponds to U.S. Ser. No. 10/788, 520).
4. [IPCOM] PrioArtDatabase http://www.ip.com/, Document number IPCOM000166286D (https://priorart.ip.com/viewPub.jsp), (c) Siemens A G 2007, Title "Bewegungsdetektion und zeitliche Filterung auf Bandpassbildern unter Verwendung mehrerer vorangegangener Bilder, Autoren: Sandra Martin, Stefan Böhm. ["Movement detection and temporal filtering of bandpass images using several earlier images", Authors: Sandra Martin, Stefan Böhm].

The invention claimed is:
1. A method for setting a filtering control variable for a noise reduction in a medical image, comprising:
determining edge thicknesses for image data of the medical image by performing a variance measurement for image pixels in the image data;
generating a histogram from the edge thicknesses;
determining a maximum value of the histogram;
fitting a Gaussian curve to the histogram;
determining a threshold value for a noise and a structure as a function of a standard deviation of the Gaussian curve;
classifying the image data into a noise region and a structure region based on the threshold value;
measuring the noise and the structure in the noise and the structure regions;

determining a standard noise deviation and a standard structure deviation in the noise and the structure regions;

comparing the standard noise deviation with the standard structure deviation; and setting the filtering control variable as a function of the comparison.

2. The method as claimed in claim 1, wherein if the standard noise deviation differs with the standard structure deviation by a minimum size, the structure region is redetermined based on a value depending on the noise.

3. The method as claimed in claim 2, wherein the structure is reestimated within the redetermined region by calculating a mean of absolute value of gray values of the image pixels in the redetermined region.

4. The method as claimed in claim 3, wherein a standard deviation of the absolute value is calculated and is taken into account during the comparison.

5. The method as claimed in claim 1, where the edge thicknesses are calculated from a difference between a variance maximum and a variance minimum of the variance measurement.

6. The method as claimed in claim 1, where a difference of the noise and the structure is clearer if a difference of the standard noise deviation and the standard structure deviation is larger.

7. The method as claimed in claim 6, where a type of dependence between the difference of the standard noise deviation and the standard structure deviation and the control variable is predefined.

8. The method as claimed in claim 1, where the image data is bandpass data.

9. An imaging system for a medical diagnostics, comprising:

a recording unit that records a medical image; and a processor that:

determines edge thicknesses for image data of the medical image by performing a variance measurement for image pixels in the image data;

generates a histogram from the edge thicknesses;

determines a maximum of the histogram;

fits a Gaussian curve to the histogram;

determines a threshold value for a noise and a structure as a function of a standard deviation of the Gaussian curve;

classifies the image data into a noise region and a structure region based on the threshold value;

measures the noise and the structure in the noise and the structure regions;

determines a standard noise deviation and a standard structure deviation in the noise and the structure regions;

compares the standard noise deviation with the standard structure deviation; and sets a filtering control variable for a noise reduction in the medical image as a function of the comparison.

* * * * *